April 17, 1956 C. BRAMMING 2,742,169
SIMPLIFIED VACUUM BOTTLE UNIT
Filed May 6, 1952
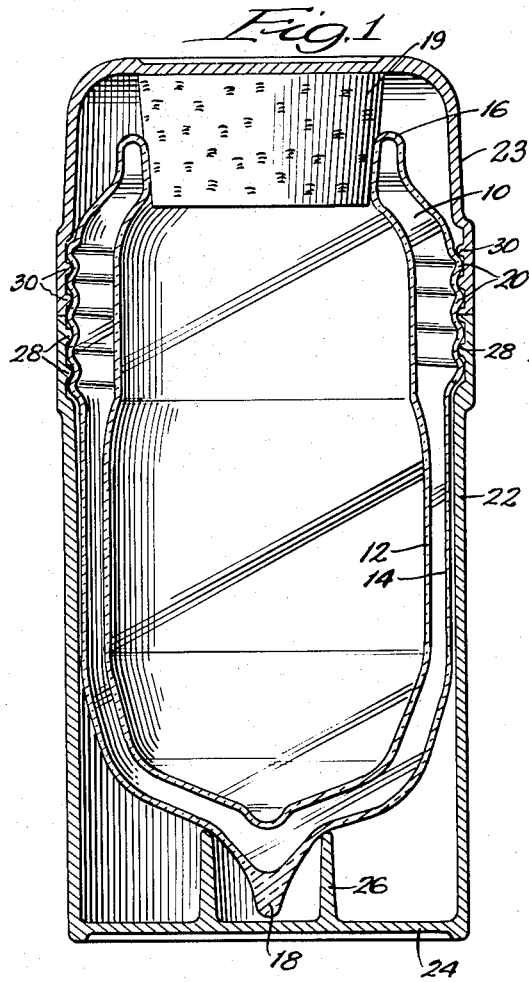
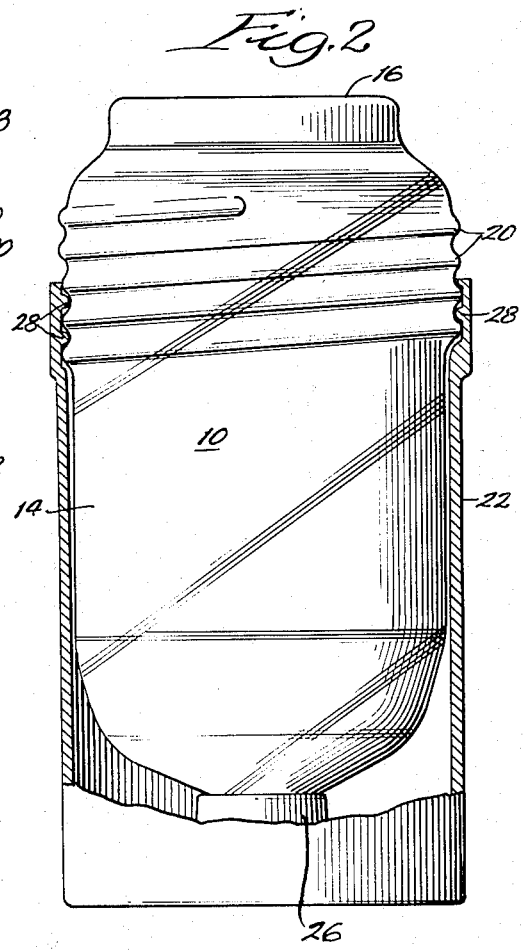
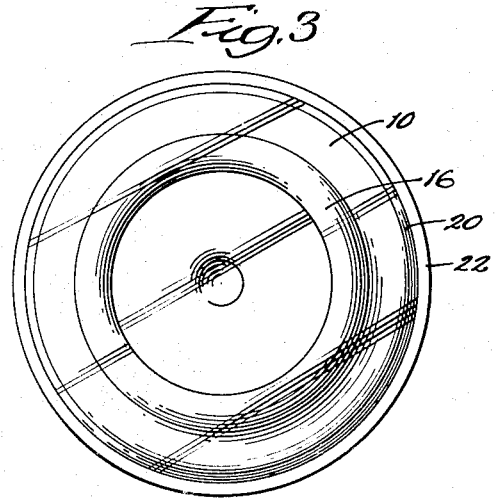
INVENTOR:
Carl Bramming
BY
Dawson & Ooms
ATTORNEYS.

United States Patent Office 2,742,169
Patented Apr. 17, 1956

2,742,169

SIMPLIFIED VACUUM BOTTLE UNIT

Carl Bramming, Nashville, Tenn., assignor to Aladdin Industries, Incorporated, Nashville, Tenn., a corporation of Illinois Application May 6, 1952, Serial No. 286,377

1 Claim. (Cl. 215—13)

This invention relates to an improved and simplified vacuum bottle unit and more particularly to a vacuum bottle which includes a vacuum insulated receptacle and a protective jacket which are covered by a threaded cap.

The usual method employed in constructing vacuum bottle units is to provide a threaded metal collar about the neck of the vacuum insulated glass receptacle of the bottle to which the outer protective jacket is either crimped or screwed to completely enclose the glass filler except for the neck portion. The threaded collar is also adapted to mate with the threads of the closure cap. Some constructions eliminate the collar altogether and the closure cap mates with screw threads provided on the jacket. All of these constructions require quite a number of elaborate parts in order to fully protect and insulate the vacuum bottle. This, of course, results in a vacuum bottle unit relatively more expensive than a vacuum bottle unit constructed according to the teaching of my invention.

It is, therefore, a general object of my invention to provide a vacuum bottle unit which is very inexpensive to make and which retains most of the advantages found in insulated bottle units. My vacuum bottle unit is characterized by simplicity and reduction of structural components resulting in a more inexpensive vacuum bottle unit than is possible by present day methods of constructing vacuum bottle units.

To accomplish this, screw threads are provided upon the outer wall of a vacuum insulated glass receptacle or filler which are capable of directly receiving mating threads of its protective cap and jacket.

These and other objects may be best understood by the following description, together with the accompanying drawings of the present invention, wherein:

Figure 1 is a vertical view in section of a vacuum bottle unit embodying my invention;

Figure 2 is an elevational side view of the vacuum bottle with a portion of the protective jacket cut away, and Figure 3 is a plan view of the top of my vacuum bottle unit.

Referring to the drawings, and more particularly to Figure 1, there is shown a wide mouth vacuum bottle having a glass filler generally indicated as 10. The vacuum insulated glass receptacle 10 is comprised of an inner wall 12 and an outer wall 14 which are joined at the top of the bottle to form a shoulder 16. The walls, 12 and 14 are permanently sealed to form an insulated receptacle after the air has been evacuated therefrom at the lowermost part leaving a fragile tubulation 18. The inner face of the outer wall 14 and the outer face of the inner wall 12 are usually coated with a reflective material to help reduce heat transfer. A closure 19, preferably made from cork or the like, is used to seal the mouth of the vacuum bottle.

The outer wall 14 of the glass receptacle 10 is formed with screw threads near its uppermost part. The screw threads 20 may be formed on the outer wall 14 by existing methods well known in the glass art.

The vacuum bottle 10 is protected by a cylindrical surrounding jacket 22 and a removable cap 23. The jacket 22, as well as the cap 24, are preferably formed from plastic materials which are relatively inexpensive and easy to mold. The jacket 22 is closed by an integral bottom 24 which may be molded as part of the jacket. A circular web 26 extends upwardly from the bottom 24 of the jacket 22 to form a housing for the delicate tubulation 18, as well as a centering portion to help seat the vacuum bottle 10 and to keep the tubulation 18 from contacting the bottom 24 of the jacket 22 which would damage the tubulation. The jacket 22, the bottom 24, and the web 26 may all be molded as one piece, which, of course, simplifies the construction of this protective jacket and greatly reduces its cost.

The jacket 22 is provided with screw threads 28 at its uppermost part which are capable of mating with the lower screw threads 20 on the outer wall 14 of the vacuum insulated receptacle 10. The cap 23 also is provided with screw threads 30 at its lowermost part which are capable of mating with the upper threads 20 of the outer wall 14 of the receptacle 10.

The receptacle 10 and the protective jacket 22 and cap 23 are assembled as follows: The receptacle 10 is simply inserted into the jacket 22 so that the tubulation 18 enters within the confines of the web 26. When the screw threads 28 of the jacket 22 meet with the screw threads 20 of the outer wall 14 of the receptacle 10, the receptacle 10 is screwed into the jacket 22 until a bottom portion of the outer wall 14 rests upon the top of the web 26. The vacuum bottle unit may then be completed by screwing the cap 23 upon the upper threads 20 of the outer wall 14 of the receptacle 10 until the bottom rim of the cap 23 abuts the top rim of the protective jacket 22 at 32. This prevents the cap from being threaded on too tightly, which might cause the glass receptacle 10 to break under the pressure.

It is to be noted that nowhere in the construction of my vacuum bottle unit is it necessary to use gaskets, insulators, etc. Furthermore, by providing the outer wall of my vacuum bottle with screw threads, the elaborate and costly construction of collars and the like is eliminated. It has been found that my construction of a vacuum bottle unit greatly reduces the cost of manufacturing vacuum bottle units without resulting in a comparable loss of the insulating qualities of a vacuum bottle unit. It should fill a long felt need in the retail market.

While I have shown and described a specific embodiment of my invention it will, of course, be understood that it is not limited thereto and that by the appended claim it is intended to cover all modifications and alternative constructions as fall within the true spirit and scope of my invention.

I claim:

A vacuum bottle unit, comprising a double-walled vacuum insulated receptacle having an outer wall with a closed bottom wall portion and a generally cylindrical side wall portion surmounting said bottom wall portion, said bottom wall portion having a fragile vestigial evacuating element thereon, said side wall portion having a plural-turn external screw thread formed thereon adjacent the upper end thereof, a protective jacket encasing the lower portion of said vacuum insulated receptacle, said jacket having a closed bottom wall and a generally cylindrical side wall surmounting said bottom wall, means on said bottom wall engaging and supporting said bottom wall portion of said vacuum insulated receptacle and protecting said fragile evacuating element, said side wall of said jacket having a cylindrical upper end portion formed with an internal screw thread disengageably mating with the lower portion of said external thread on said vacuum insulated receptacle, a cup-shaped removable cap enclosing the upper end of said vacuum insulated receptacle, said cap having a closed top wall and an annular side wall depending therefrom, said side wall of said cap having a cylindrical lower end portion formed with an internal screw thread disengageably mating with the upper portion of said external thread on said vacuum insulated receptacle, said cylindrical upper end portion of said jacket and said cylindrical lower end portion of said cap being of generally the same outer diameter and being in end-to-end engagement when said cap is mated with said thread on said vacuum insulated receptacle.

References Cited in the file of this patent

UNITED STATES PATENTS

| | | |
|---|---|---|
| 1,473,814 | Durand | Nov. 13, 1923 |
| 1,760,321 | Seigheim | May 27, 1930 |
| 1,921,962 | Bissell | Aug. 8, 1933 |

FOREIGN PATENTS

| | | |
|---|---|---|
| 76,151 | Switzerland | Nov. 1, 1917 |
| 1,017,098 | France | Sept. 10, 1952 |